United States Patent
Tse

(10) Patent No.: US 6,439,840 B1
(45) Date of Patent: Aug. 27, 2002

(54) BYPASS DUCT FAN NOISE REDUCTION ASSEMBLY

(75) Inventor: Man-Chun Tse, Brossard (CA)

(73) Assignee: Pratt & Whitney Canada Corp., Quebec (CA)

( * ) Notice: Subject to any disclaimer, the term of this patent is extended or adjusted under 35 U.S.C. 154(b) by 55 days.

(21) Appl. No.: 09/725,928

(22) Filed: Nov. 30, 2000

(51) Int. Cl.⁷ .............................................. F01D 25/06
(52) U.S. Cl. ........................ 415/119; 415/1; 415/208.1
(58) Field of Search ............................ 415/119, 1, 115, 415/209.1, 142, 208.1; 244/1 N, 209; 181/213, 214

(56) References Cited

U.S. PATENT DOCUMENTS

| | | | |
|---|---|---|---|
| 3,533,486 A | * 10/1970 | Paulson ........................ | 415/119 |
| 3,583,417 A | * 6/1971 | Clark et al. ................... | 415/119 |
| 3,618,700 A | * 11/1971 | Issaquah et al. ............ | 415/119 |
| 3,829,237 A | * 8/1974 | Chestnutt ..................... | 415/119 |
| 3,908,683 A | * 9/1975 | Demetrick .................... | 138/46 |
| 3,937,590 A | 2/1976 | Mani ............................. | 415/119 |
| 4,104,002 A | 8/1978 | Ehrich .......................... | 415/119 |
| 4,300,656 A | 11/1981 | Burcham | |
| 5,717,172 A | 2/1998 | Griffin, Jr. et al. | |
| 6,139,259 A | * 10/2000 | Ho et al. ...................... | 415/119 |

* cited by examiner

Primary Examiner—F. Daniel Lopez
Assistant Examiner—Richard Woo
(74) Attorney, Agent, or Firm—Bachman & LaPointe, P.C.

(57) ABSTRACT

A gas turbine engine fan assembly includes fan blades spaced axially from stator vanes inside an annular bypass duct. A plurality of perforated baffle plates are installed in the annular bypass duct downstream of the stator vanes. The perforated baffle plates extend in a generally axial direction and are unevenly, circumferentially spaced apart from one another to divide a major section of the annular bypass duct into a plurality of axial flow-path segments in an asymmetrical pattern to disrupt continuity, destroy a symmetrical pattern and absorb sound energy of a spinning mode of sound pressures imbedded in the air flow downstream of the stator vanes, without substantially affecting a thrust provided by the air flow when discharged from the bypass duct. The invention provides a solution for suppressing rearward noise propagation of a fan BPF tone and higher harmonics thereof through the annular bypass duct of a gas turbine engine, which contributes to the reduction of aircraft noises, particularly during take-off.

21 Claims, 4 Drawing Sheets

BYPASS DUCT FAN NOISE REDUCTION ASSEMBLY

FIELD OF THE INVENTION

This invention relates to suppression of noise sound waves emitted from a jet engine, more particularly to the suppression of noise propagation from a gas turbine engine fan assembly downstream through the bypass duct thereof.

BACKGROUND OF THE INVENTION

Noise has been a significant negative factor associated with the commercial airline industry since the introduction of the aircraft gas turbine engine. Considerable effort has been directed toward quieting aircraft engines.

Gas turbine engine noise is generated by two primary sources. First, there is noise associated with viscous shearing of rapidly moving gases exhausted into the relatively quiescent surrounding atmosphere. In turbo fan aircraft engines, such gases are emitted from the fan and core nozzles at the rear of the engine. Various approaches have been utilized to reduce this "shear" noise, most approaches incorporating mixers to co-mingle fan and exhaust gases with each other and with the surrounding environment.

The second source of noise is the rotating turbo machinery itself, as the result of rapidly rotating blade rows disposed within the gas stream. Fans and compressors include at least one row of a plurality of circumferentially spaced apart rotor blades for compressing air channeled therethrough, and a row of circumferentially spaced apart stator vanes axially spaced apart from the rotor blades. The rotor blades rotate about a longitudinal centerline axis of the engine at a rotational speed and effect a tonal noise at a blade passing frequency (BPF). The aerodynamic interaction of rotor blade-wakes and stationary vanes adds a significant contribution to the noise produced by the jet gas turbine engine. Interaction tones are generated in the region between the rotor blades and the stator vanes, within the annular duct surrounding the blades and the vanes, conventionally known as spinning mode tones or noises.

The blade rotation-wakes of the air compressed by the rotor blades form rotational pressure fields and impinge on the stator vanes, thereby creating the spinning mode tones.

The spinning mode tones occur at discrete frequencies including the fundamental blade passing frequency BPF, alternatively referred to herein as the first harmonic, and higher order frequencies including the second, third and higher harmonics. When this spinning mode speed is fast enough to reach a local Mach number to be greater than about 1.1, the spinning mode tones will propagate outside, both upstream through the duct inlet and downstream through the bypass duct, enhancing BPF tone levels generated directly by the rotor blades.

In order to reduce the spinning mode tone noises, it is well known in the art to direct the spinning mode tones to impinge on the walls of the interior of the engine, including the bypass duct, which is lined with a sound absorbent material. This technique causes the spinning mode tones to decay before exiting the engine. Normally, the bypass duct liners are tuned for the BPF tone and the higher harmonics cannot be efficiently suppressed. In addition, because of the limited duct wall area within most conventional jet engines, such acoustical wall treatment has only made small reductions in fan noise levels, and this is compounded by engine nacelle length-to-radius ratios becoming smaller.

Efforts have been made to seek alternative solutions to reduce engine fan noise levels. Reduction of the spinning mode noise can be achieved by reduction of the production processes at the source of the noise which reduces the incident aerodynamic unsteadiness or the mode generation from fan-stator interactions. It is conventionally known in the art to select the number of vanes and the number of blades to create a spinning mode propagation cut-off phenomenon, as described, for example, by Gliebe et al. in their U.S. Pat. No. 5,169,288 issued on Dec. 8, 1992. In practice, for the spinning mode propagation cut-off a number V of vanes and number B of blades are selected to achieve V>2.3B. In some designs, however, particularly in high bypass turbine fan engines requiring a relatively large number of rotor blades, a cut-on fan-stator V<2B may be selected in order to find a compromise with other design criteria. In such cases, the spinning mode is always cut-on, resulting in increasing the fan BPF tone noise and its higher harmonics.

In U.S. Pat. No. 4,300,656 issued to Burcham on Nov. 17, 1981, Burcham describes an acoustic noise elimination assembly having the capability of disrupting the continuity of rotating fields of sound pressures forwardly projected from fans or rotors of a type commonly found in the front or compressor first stage of air-breathing engines, when operating at tip speeds in the supersonic range. The assembly includes a tubular cowl defining a duct for delivering an air stream axially into the intake of a jet engine and sound barrier, defined by a plurality of intersecting flat plates or struts having a line of intersection coincident with a longitudinal axis of the tubular cowl, which serves to disrupt the continuity of rotating fields of multiple tonal components of a noise.

Nevertheless, in addition to the conventional bypass duct acoustic liner, few attempts have been made to reduce the rearward propagation of a fan BPF tone and its harmonics which increase a total noise level emitted from the rear of an engine, thereby more severely affecting the environment especially in a take-off condition. Therefore, it is desirable to develop new methods and apparatus to attenuate the fan BPF tone and its harmonics within the bypass duct of gas turbine engines.

SUMMARY OF THE INVENTION

It is an object of the present invention to provide a method and an apparatus to suppress the fan BPF tone noise and higher harmonics thereof within bypass ducts of gas turbine engines.

It is another object of the present invention to provide an apparatus to disrupt continuity, destroy a symmetrical pattern and absorb sound energy of a spinning mode of sound pressures in a bypass duct of a gas turbine engine.

It is a further object of the present invention to provide a gas turbine engine fan assembly with a low level fan BPF tone noise and higher harmonics thereof propagating rearwardly out of the engine.

It is a still further object of the present invention to provide a method and an apparatus for suppressing rearward noise propagation of a fan BPF tone and higher harmonics thereof through a bypass duct of a gas turbine engine without substantially affecting the thrusts provided by the air flow when discharged from the bypass duct.

In general terms according to the present invention, rearward noise propagation of fan BPF tone and higher harmonics thereof through an annular bypass duct of a gas turbine engine is suppressed in the annular bypass duct downstream of a plurality of stator vanes by disrupting continuity, destroying a symmetrical pattern and absorbing sound energy of a spinning mode of sound pressures imbedded in an air flow downstream of the stator vanes without substantially affecting a thrust provided by the air flow when discharged from the annular bypass duct.

In accordance with one aspect of the present invention an apparatus for suppressing rearward noise propagation of a fan BPF tone and higher harmonics thereof through an annular bypass duct of a gas turbine engine comprises at least one perforated baffle plate, preferably a plurality of perforated baffle plates, extending generally in an axial direction with respect to the gas turbine engine and adapted to divide a major section of the annular bypass duct downstream of a plurality of stator vanes, into a plurality of axial flow-path segments. The axial flow-path segments are in fluid communication with one another through the perforations in the at least one baffle plate. When the plurality of the perforated baffle plates are provided, the axial flow-path segments are in fluid communication with adjacent ones through the perforations in the respective baffle plates.

It is desirable that the perforated baffle plates are unevenly circumferentially spaced apart from one another so that the axial flow-path segments are formed in an asymmetrical pattern.

In one embodiment of the present invention the perforations in the respective baffle plates have a percentage of opening area (POA) ranging from 20% to 50%, and are in a staggered hole pattern. It is also preferable that the perforations in the respective baffle plates include holes having uniform diameters and a ratio of individual hole diameter to plate thickness between 0.5 and 2.0.

In accordance with another aspect of the present invention, there is a gas turbine engine fan assembly which comprises a plurality of circumferentially spaced rotor blades; a plurality of circumferentially spaced rotor vanes axially spaced apart from the rotor blades; an annular duct surrounding the rotor blades and stator vanes, and having an inlet for receiving an air flow and an outlet for discharging at least a portion of the air flow compressed by the rotor blades and passed over stator vanes; and means installed in the annular duct downstream of the stator vanes for disrupting continuity, destroying a symmetrical pattern and absorbing sound energy of a spinning mode of sound pressures imbedded in the air flow, downstream of the stator vanes, without substantially affecting a thrust provided by the air flow when discharged. The means according to one embodiment of the invention comprises at least one perforated baffle plate extending generally in an axial direction with respect to the fan assembly, dividing a major section of the annular duct downstream of the stator vanes into at least two axial flow-path segments. The two axial flow-path segments are in fluid communication with each other through the perforations in at least one baffle plate.

According to another embodiment of the present invention, the means comprises a plurality of perforated baffle plates extending generally in an axial direction with respect to the fan assembly, each adapted to span across an annulus defined between inner and outer walls of the annular bypass duct. Thus, a major section of the annular duct downstream of the stator vanes is divided into a plurality of axial flow-path segments. The axial flow-path segments are in fluid communication with adjacent ones through the perforations in the respective baffle plates. The perforated baffle plates are preferably separated axially from the stator vanes by a space relatively small with respect to a length of the perforated baffle plates. Each of the perforated baffle plates may be slightly curved so that a downstream section of the plate is gently and gradually deviated from an axial orientation in a circumferential direction opposite to a rotation of the rotor blades. The circumferential deviation is preferably small relative to the length of the perforated baffle plate. It is also preferably to have the perforated baffle plates unevenly circumferentially spaced apart from one another so that the axial flow-path segments are formed in a asymmetrical pattern.

The present invention provides a solution effective for suppressing rearward noise propagation of fan noise in a bypass duct of a gas turbine engine without substantially affecting the thrust provided by the air flow when discharged from the bypass duct. Other advantages and features will be better understood with reference to preferred embodiments to be described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1:
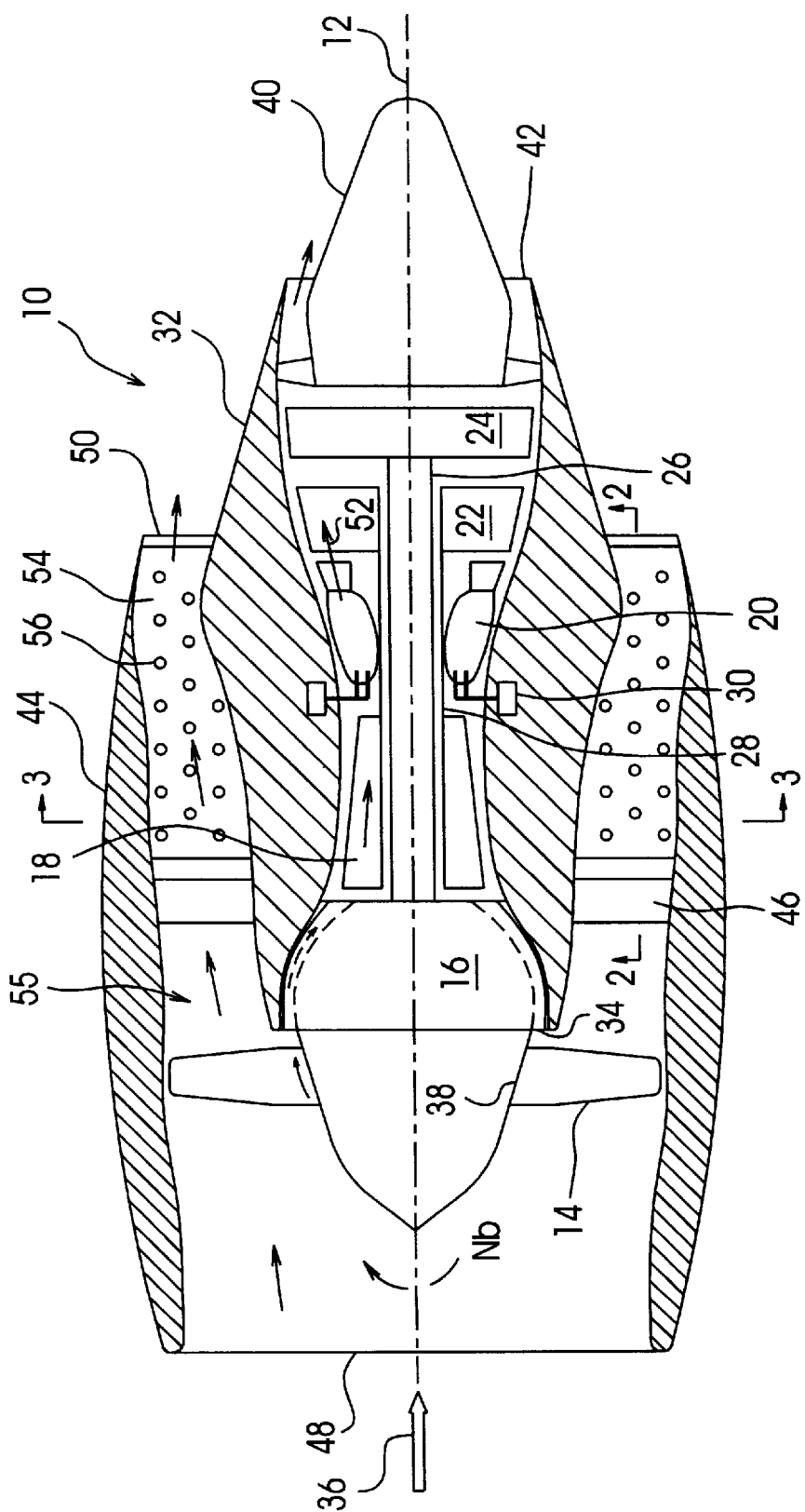
FIG. 1 is a longitudinal cross-sectional schematic view of a gas turbine engine having a short cowl nacelle incorporating one embodiment of the present invention.

Referring to the drawings, particularly FIG. 1, an exemplary gas turbine engine 10 includes in serial flow communication about a longitudinal center axis 12, a fan having a plurality of circumferentially spaced apart fan, or rotor blades 14, a conventional low pressure compressor 16, a conventional high pressure compressor 18, a conventional annular combustor 20, a conventional high pressure turbine 22 and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Conventional fuel injecting means 30 are provided for selectively injecting fuel into the combustor 20 for powering the engine 10.

A conventional annular casing 32 surrounds the engine 10 from the low pressure compressor 16 to the low pressure turbine 24, and defines, with the low pressure compressor 16, a low pressure compressor inlet 34 for receiving a portion of ambient air 36 thereof. The downstream end of the casing 32 defines with a conventional annular exhaust plug 40 an annular exhaust outlet 42. A portion of the air 36 compressed by the fan blades 14 adjacent to the blade roots 38 are further compressed by the low pressure compressor 16 and the high pressure compressor 18 and forced into the combustor 20. The mixture of the compressed air 36 and the fuel injected by the fuel injecting means 30 generate combustion gases 52. The combustion gases 52 cause the high pressure turbine 22 and the low pressure turbine 24 to rotate respectively for powering the high pressure compressor 18, low pressure compressor 16 and the fan blades 14. Surrounding the blades 14 and the upstream portion of the casing 32 is a short cowl nacelle 44 which is spaced radially outwardly from the casing 32 to define with the casing 32 an annular duct 55 for permitting the radially outer portion of the air 36 compressed by the fan blades 14 to bypass the engine. A plurality of circumferentially spaced stator vanes 46 extend radially between the casing 32 and the nacelle 44, and are spaced apart axially downstream of the fan blades 14. The nacelle 44 includes an inlet 48 at its upstream end for receiving the ambient air 36 and an outlet 50 for discharging the portion of the air 36 which is compressed by the fan blades 14 and passed over the stator vanes 46 for providing a portion of a thrust. The air flow discharged from the outlet 50 of the bypass duct 55 mixes with the combustion gases 52 discharged from the exhaust outlet 42 of the engine to form jet exhaust, thereby creating jet exhaust noise in the surrounding air.

Figure 3:
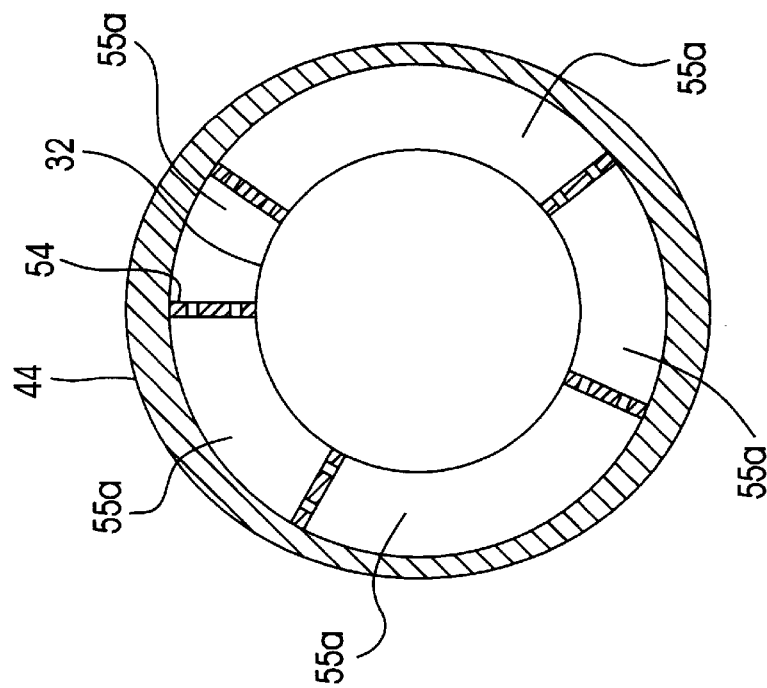
FIG. 3 is a cross-sectional view taken along line 3—3 in FIG. 1 showing an asymmetrical pattern of the flow-path segments divided by the baffle plates in the bypass duct.

In addition to the jet exhaust noise, there is fan noise. During operation of the engine 10, air 36 enters the inlet 48 and passes the fan blades 14, due to both the aircraft movement and the suction generated by the rotating fan blades 14. The air 36 passing the rotating fan blades 14 effects a blade passing frequency BPF noise which is a product of the rotational speed $N_b$ and the number B of the fan blades 14. The portion of the air 36 compressed by the fan blades 14 and passing the stator vanes 46, under the fan-stator interaction, generates spinning mode tones, resulting in increasing the BPF tone level and higher harmonics thereof. The BPF tone noise and higher harmonics thereof propagate both forwardly and rearwardly out of the gas turbine engine 10 through the inlet 48 and the outlet 50. In order to significantly reduce rearward fan noise propagation, at least one perforated baffle plate, but preferably a plurality of perforated baffle plates 54 are installed in a section of the annular bypass duct 55 downstream of the stator vanes 46. The perforated baffle plates 54 in this particular embodiment of the present invention, are flat, which is more clearly shown in FIG. 2a, and axially spaced apart from the stator vanes 46 and span across an annulus defined between inner and outer walls of the bypass duct 55, to divide a major section of the annular bypass duct 55 downstream of the stator vanes 46 into a plurality of axial flow-path segments 55a as shown in FIG. 3.

Figure 2A:
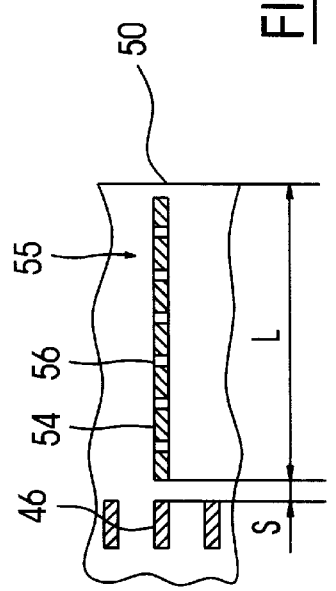
FIG. 2a is a radial view of the bypass duct of the gas turbine engine illustrated in FIG. 1 taken along line 2—2, showing a flat baffle plate axially spaced apart from a stator vane.

The axial space between the perforated baffle plates 54 and the stator vanes 46, indicated by letter S as shown in FIG. 2a, is substantially small with respect to the length L of the perforated baffle plates 54. The baffle plates 54 are unevenly, circumferentially spaced apart from one another so that the axial flow-path segments 55a of the annular bypass duct 55 are formed in an asymmetrical pattern, as illustrated in FIG. 3.

Each perforated baffle plate 54 includes holes 56 in a staggered pattern and the holes 56 have a percentage of opening area POA ranging from 20% to 50%. The holes 56 preferably have uniform diameters and a ratio of individual hole diameter to plate thickness between 0.5 and 2.0. The holes 56 in the baffle plates 54 communicate the adjacent axial flow-path segments 55a of the annular bypass duct 55.

The principle of the present invention is explained with details below. Downstream of the fan blades 14, the air 36 compressed by the fan blades 14 is swirling because of the rotating fan blades 14. This swirl will cause loss of momentum before a portion of the air 36 compressed by the fan blades 14 exists the outlet 50 of the annular bypass duct 55, and therefore it is straightened out with the stator vanes 46. These stator vanes 46 are a source of fan noise as the symmetrical rotation-wakes of the air 36 compressed by the fan blades 14 impinge on the stator vanes 46, thereby creating a spinning mode tone noise including the fundamental BPF tone and higher harmonics. When this spinning mode reaches the local Mach number M greater than about 1.1, spinning mode tone noise will propagate both forwardly and rearwardly outside of the annular bypass duct 55. The local Mach number M is described by the following equation:

$$M = V_m/a$$

wherein:
 a is a sound speed in the local sound propagation medium, and
 $V_m$ is the maximum tangential speed of the rotational spinning mode and is proportional to the spinning mode rotational speed $N_m$.

The spinning mode rotational speed $N_m$ is also proportional to the rotational speed $N_b$ of the fan blades 14, which may be represented by the following equation:

$$N_m = (nB/m)N_b$$

wherein:
 B is the number of the fan blades 14,
 n is the blade passing frequency harmonic integer number, and
 m is the spinning mode number determined by an equation as follows:
ti $m = nB + kV$ wherein:
 V is the number of the stator vanes 46, and
 k is the index number that may take on all positive and negative integers, including zero as an integer.

From the above equations it is apparent that when the engine operation condition is certain, i.e. $N_b$ unchanged a proper selection of the number B and V will affect the spinning mode speed $N_m$, resulting in a change of the local Mach number M. Based on this principle, the prior art spinning mode propagation cut-off technology has been developed. However, as a compromise to other design criteria, the selection of the number B and V cannot always satisfy the propagation cut-off requirements. Therefore the spinning mode tone noise will be present in the annular bypass duct 55 and subsequently discharged at the outlet 50 of the annular bypass duct 55. The principle of the present invention is that reduction of rearward noise propagation in the bypass duct is conducted through direct attenuation or flow modulation to disrupt continuity, destroy the symmetrical pattern and absorb the sound energy of the spinning mode of the sound pressures. This is implemented with the perforated baffle plates 54 which absorb and reflect the rotational components of the incident wave, particularly through the action of flow through the baffle holes 56. As the spinning mode is imbedded in the flow, a modulation of the bypass flow by the perforated baffle plates 54 will attenuate the spinning mode tones. The perforated baffle plates 54 extend in a generally axial direction so that the perforated baffle plates 54 interfere only with the rotational components of the spinning mode of sound pressures imbedded in the air flow, but as straighteners they do not affect the thrust provided by the air flow when discharged from the annular bypass duct 55.

Figure 2B:
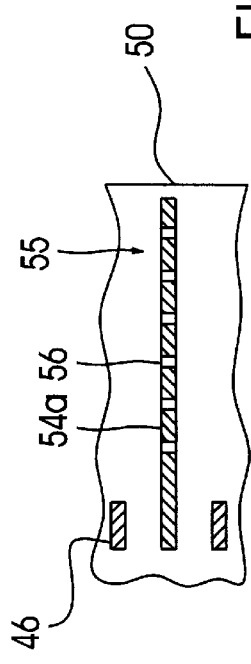
FIG. 2b is a view similar to FIG. 2a, showing a flat baffle plate integrated with a stator vane according to an alternative embodiment.
Figure 2C:
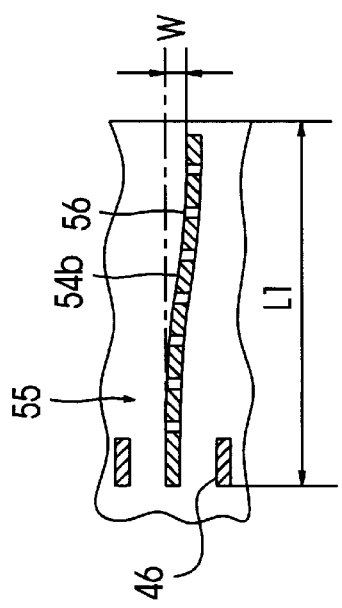
FIG. 2c is a view similar to FIG. 2a showing a curved baffle plate integrated with a stator vane and slightly deviated from its axial orientation.

FIGS. 2b and 2c illustrate alternative embodiments. The space S between the perforated baffle plates 56 and the stator vanes 46 can be reduced to zero. In one alternative embodiment of the present invention illustrated in FIG. 2b, a perforated baffle plate 54a is integrated with a stator vane 46 that is axially aligned with the perforated baffle plate 54a. However, not all stator vanes 46 can be integrated with the baffle plates because the number of stator vanes 46 is usually much greater than the number of perforated baffle plates 54a and only a few stator vanes are aligned with respective baffle plates 54a. In another alternative of the present invention illustrated in FIG. 2c, a perforated baffle plate 54b is integrated with one aligned stator vane 46 and gently and gradually curved to deviate slightly from the axial orientation in a circumferential direction opposite to the rotational speed $N_b$ of the fan blades 14. The angled position of the baffle plate 54b will more effectively interfere with the rotational components of the air flow and the spinning mode of the sound pressures. Nevertheless, the deviation indicated by W must be small relative to the length L1 of the perforated baffle plate 54b. The perforations can spread over the area of the baffle plate 54b as shown in FIG. 2c or they may just cover a major section thereof, downstream of the stator vane position as shown in FIG. 2b.

Figure 4:
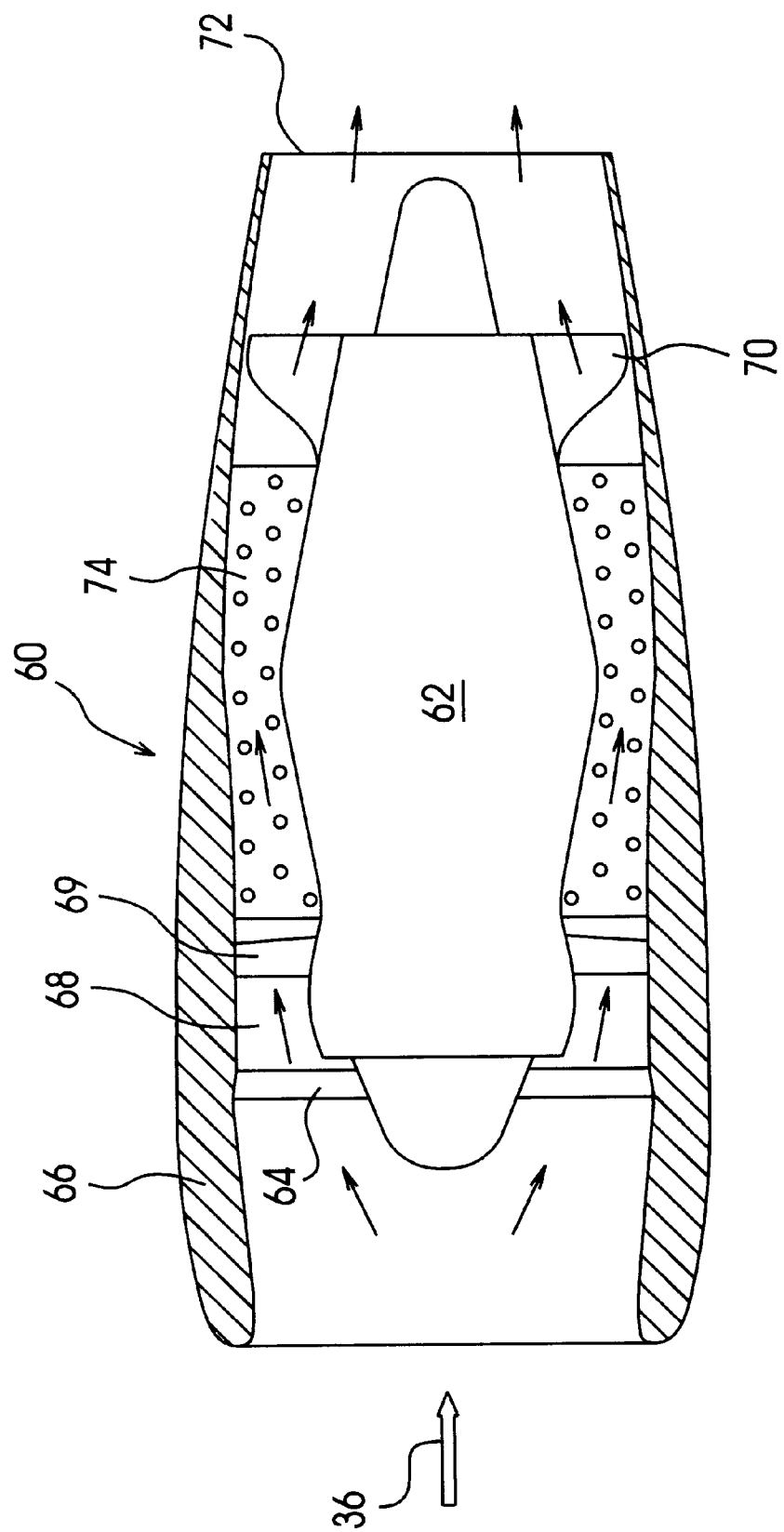
FIG. 4 is a longitudinal cross-sectional schematic view of a gas turbine engine having a long cowl nacelle, incorporating an embodiment of the present invention.

The present invention is also applicable to a long cowl nacelle of a gas turbine engine which is illustrated schematically, in a plan view, partly in section, in FIG. 4. An exemplary gas turbine engine 60 is a long cowl mixed flow exhaust fan engine including a centrally disposed core engine 62. The core engine 62 is coupled to drive a plurality of fan blades 64 disposed upstream of the core engine 62. The fan blades 64 and the core engine 62 are disposed inside a nacelle structure 66 which together with the core engine 62 forms an annular bypass duct 68 for directing a predetermined portion of the air flow 36 from the fan blades 64 over a plurality of stator vanes 69 and a mixer device 70 toward the exhaust nozzle 72 for producing the thrust in a manner well known in the art.

According to one embodiment of the present invention a plurality of perforated baffle plates 74 are provided in the annular bypass duct 68 to divide a major section of the annular bypass duct 68 between the stator vanes 69 and the mixer device 70, into a plurality of axial flow-path segments in an asymmetrical pattern. The structural details of the baffle plates 74 and the options for alternative embodiments as well as the asymmetrical pattern of the flow-path segments are similar to those illustrated in FIGS. 1–3, and will not be redundantly described.

Figure 5:
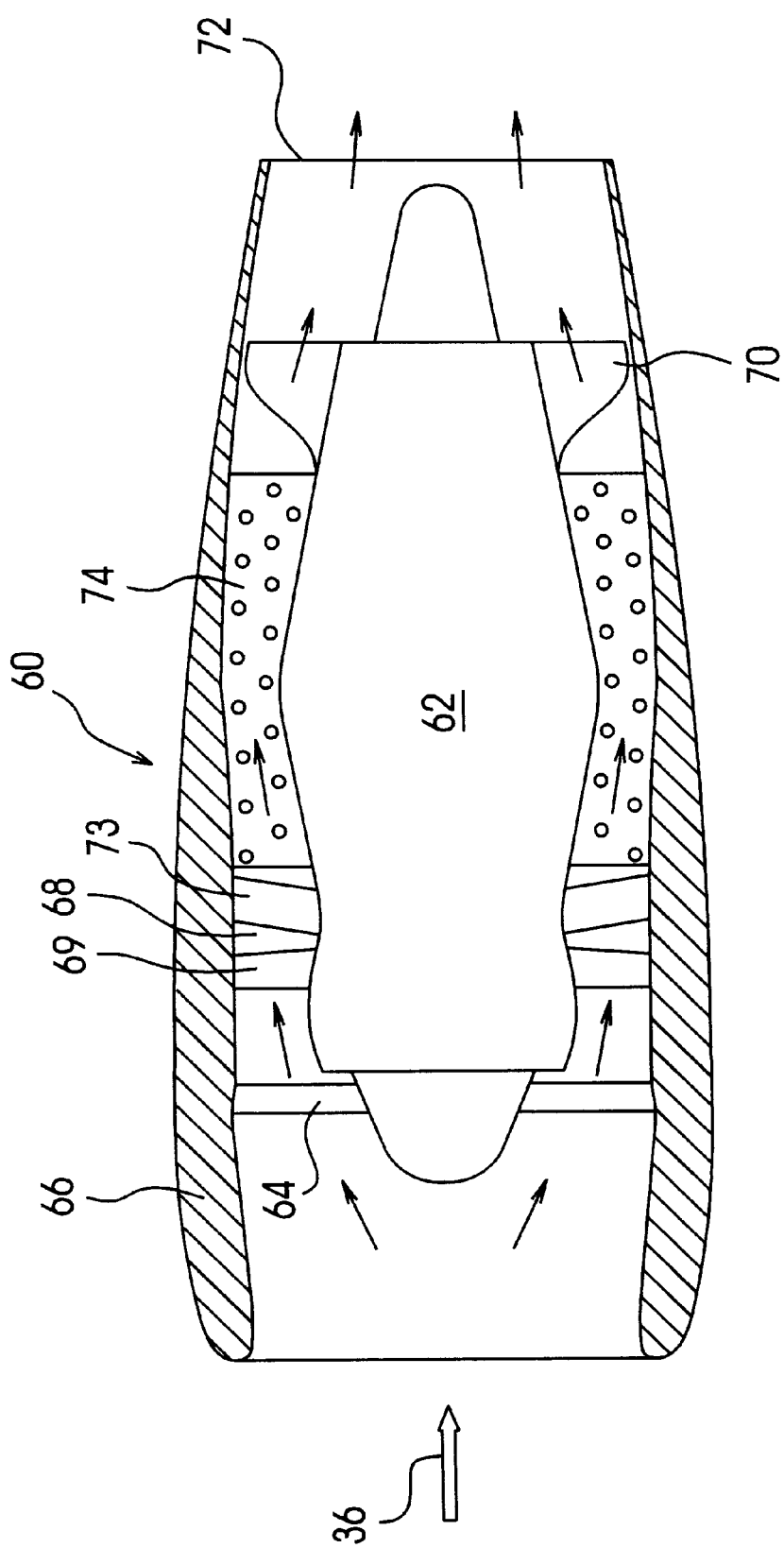
FIG. 5 is a longitudinal cross-sectional schematic view of the engine shown in FIG. 4, incorporating another embodiment of the present invention.

According to another embodiment of the present invention, as illustrated in FIG. 5, a plurality of perforated baffle plates 74 are provided in the annular bypass duct 68 downstream of struts 73. The perforated baffle plates 74 are aligned with the respective struts 73, either slightly spaced apart therefrom, or integrated therewith, thereby dividing the section of the annular bypass duct 68 between the struts 73 and the mixer device 70, into a plurality of axial flow-path segments.

Modifications and improvements to the above-described embodiments of the present invention may become apparent to those skilled in the art. The forgoing description is intended to be exemplary rather than limiting. The scope of the present invention is therefore intended to be limited solely by the scope of the appended claims.

I claim:

1. An apparatus for suppressing rearward noise propagation of a fan BPF tone and higher harmonics thereof through an annular bypass duct of a gas turbine engine comprising at least one perforated baffle plate extending generally in an axial direction with respect to the gas turbine engine and adapted to divide a major section of the annular bypass duct downstream of a plurality of stator vanes and struts into a plurality of axial flow-path segments, the axial flow-path segments being in fluid communication with one another through the perforations in the at least one baffle plate.

2. An apparatus as claimed in claim 1 comprising a plurality of perforated baffle plates extending generally in an axial direction with respect to the gas turbine engine, each adapted to span across an annulus defined between inner and outer walls of the annular bypass duct, the axial flow-path segments being in fluid communication with adjacent ones through the perforations in the respective baffle plates.

3. An apparatus as claimed in claim 2 wherein the plurality of perforated baffle plates are positioned downstream of, and axially aligned with, said plurality of struts spanning across the annulus of the annular bypass duct.

4. An apparatus as claimed in claim 1 wherein the perforated baffle plates are unevenly circumferentially spaced apart from one another so that the axial flow-path segments are formed in an asymmetrical pattern.

5. An apparatus as claimed in claim 1 wherein the perforations in the respective baffle plates have a percentage of opening area POA ranging from 20% to 50%.

6. An apparatus as claimed in claim 1 wherein the perforations in the respective baffle plates are in a staggered hole pattern.

7. An apparatus as claimed in claim 1 wherein the perforations in the respective baffle plates include holes having uniform diameters and have a ratio of individual hole diameter to plate thickness between 0.5 and 2.0.

8. A gas turbine engine fan assembly comprising:
a plurality of circumferentially spaced rotor blades;
a plurality of circumferentially spaced stator vanes axially spaced apart from the rotor blades;
an annular duct surrounding the rotor blades and stator vanes, and having an inlet for receiving an air flow and an outlet for discharging at least a portion of the air flow compressed by the rotor blades and passed over the stator vanes; and
perforated means positioned in the annular duct downstream of the stator vanes and struts for disrupting continuity, destroying a symmetrical pattern and absorbing sound energy of a spinning mode of sound pressures imbedded in the air flow downstream of the stator vanes, without substantially affecting a thrust provided by the air flow when discharged from the annular bypass duct.

9. A fan assembly as claimed in claim 8 wherein the perforated means comprises at least one perforated baffle plate extending generally in an axial direction with respect to the fan assembly, dividing a major section of the annular duct downstream of the stator vanes into at least two axial flow-path segments, the two axial flow-path segments being in fluid communication with each other through the perforations in the at least one baffle plate.

10. A fan assembly as claimed in claim 8 wherein the perforated means comprises a plurality of perforated baffle plates extending generally in an axial direction with respect to the fan assembly, each spanning across an annulus defined between inner and outer walls of the annular bypass duct, whereby a major section of the annular duct downstream of the stator vanes is divided into a plurality of axial flow-path segments, the axial flow-path segments being in fluid communication with adjacent ones through the perforations in the respective baffle plates.

11. A fan assembly as claimed in claim 10 wherein the perforated baffle plates are located downstream of, and aligned with, a plurality of struts spanning across the annulus of the annular bypass duct.

12. A fan assembly as claimed in claim 10 wherein the perforated baffle plates are unevenly circumferentially spaced apart from one another so that the axial flow-path segments are formed in an asymmetrical pattern.

13. A fan assembly as claimed in claim 10 wherein the perforated baffle plates are separated axially from the stator vanes by a space substantially small with respect to a length of the perforated baffle plates.

14. A fan assembly as claimed in claim 10 wherein each of the perforated baffle plates is slightly curved so that a downstream section of the plate is gently and gradually deviated from an axial orientation in a circumferential direction opposite to a rotation of the rotor blades, the circumferential deviation being substantially small relative to a length of the perforated baffle plate.

15. A fan assembly as claimed in claim 10 wherein the perforations in the respective baffle plates have a percentage of opening area POA ranging from 20% to 50%.

16. A fan assembly as claimed in claim 10 wherein the perforations in the respective baffle plates are in a staggered hole pattern.

17. A fan assembly as claimed in claim 10 wherein the perforations in the respective baffle plates include holes having uniform diameters, and have a ratio of hole diameter to plate thickness between 0.5 and 2.0.

18. A method for suppressing rearward noise propagation of a fan BPF tone and higher harmonics thereof through an annular bypass duct of a gas turbine engine comprising: in the annular bypass duct downstream of a plurality of stator vanes, disrupting continuity, destroying a symmetrical pattern and absorbing sound energy of a spinning mode of sound pressures imbedded in an air flow downstream of the stator vanes, without substantially affecting a thrust provided by the air flow when discharged from the annular bypass duct.

19. A method as claimed in claim 18 wherein the disrupting continuity, destroying the symmetrical pattern and absorbing sound energy of the spinning mode of sound pressures is conducted by using at least one perforated baffle plate extending generally in an axial direction with respect to the gas turbine engine and adapted to divide a major section of the annular bypass duct downstream of a plurality of stator vanes into at least two axial flow-path segments, the two axial flow-path segments being in fluid communication with each other through the perforations in the at least one baffle plate.

20. A method as claimed in claim 18 wherein the disrupting continuity, destroying the symmetrical pattern and absorbing sound energy of the spinning mode of sound pressures is conducted by using a plurality of perforated baffle plates extending generally in an axial direction with respect to the gas turbine engine, each adapted to span across an annulus defined between inner and outer walls of the annular bypass duct, whereby a major section of the annular bypass duct downstream of a plurality of stator vanes is divided into a plurality of axial flow-path segments, the axial flow-path segments being in fluid communication with adjacent ones through the perforations in the respective baffle plates.

21. A method as claimed in claim 20 wherein the perforated baffle plates are unevenly circumferentially spaced apart from one another so that the axial flow-path segments are formed in an asymmetrical pattern.

* * * * *